(12) United States Patent
Nibauer et al.

(10) Patent No.: US 8,488,250 B2
(45) Date of Patent: Jul. 16, 2013

(54) PERIMETER PIEZO RESERVOIR IN A LENS

(75) Inventors: Lisa Nibauer, Short Hills, NJ (US); Matthew Wallace Peterson, San Francisco, CA (US); Daniel Senatore, San Francisco, CA (US); Urban Schnell, Munchenbuchsee (CH); Karim Haroud, Chavannes sur Moudon (CH)

(73) Assignee: Adlens Beacon, Inc., Pembroke Park, FL (US)

( * ) Notice: Subject to any disclaimer, the term of this patent is extended or adjusted under 35 U.S.C. 154(b) by 0 days.

(21) Appl. No.: 13/270,910

(22) Filed: Oct. 11, 2011

(65) Prior Publication Data

US 2012/0087015 A1   Apr. 12, 2012

Related U.S. Application Data

(60) Provisional application No. 61/391,827, filed on Oct. 11, 2010.

(51) Int. Cl.
  *G02B 1/06*   (2006.01)
(52) U.S. Cl.
  USPC ............ 359/666; 359/665; 351/159.68
(58) Field of Classification Search
  USPC .................. 351/159.68; 359/665, 666
  See application file for complete search history.

(56) References Cited

U.S. PATENT DOCUMENTS

| | | |
|---|---|---|
| 2,576,581 A | 11/1951 | Edwards |
| 2,836,101 A | 5/1958 | De Swart |
| 2,976,766 A | 3/1961 | Bianchi |
| 3,598,479 A | 8/1971 | Wright |
| 3,614,215 A | 10/1971 | Mackta |
| 4,181,408 A | 1/1980 | Senders |
| 4,477,158 A | 10/1984 | Pollock et al. |
| 4,890,903 A | 1/1990 | Treisman et al. |
| 4,913,536 A | 4/1990 | Barnea |
| 5,080,476 A | 1/1992 | Monin |
| 5,138,494 A | 8/1992 | Kurtin |
| 5,182,585 A | 1/1993 | Stoner |
| 5,229,885 A | 7/1993 | Quaglia |
| 5,371,629 A | 12/1994 | Kurtin et al. |

(Continued)

FOREIGN PATENT DOCUMENTS

WO   WO 2008/063442 A1   5/2008

OTHER PUBLICATIONS

Borish, I.M., *Clinical Refraction*, 3rd Edition, Chapter 26 (pp. 1051-1113), The Professional Press, Inc., Chigaco, 65 pages (1970).

(Continued)

*Primary Examiner* — Darryl J Collins
*Assistant Examiner* — Gary O'Neill
(74) *Attorney, Agent, or Firm* — Sterne, Kessler, Goldstein & Fox P.L.L.C.

(57) ABSTRACT

An embodiment of a piezoelectric actuator system for a fluid-filled lens is described herein. A piezoelectric reservoir is provided encompassing a fluid. In an embodiment, the reservoir is disposed around the perimeter of a lens module within a housing. In an embodiment, electrodes are woven into the reservoir and connected to a power source. An applied potential causes the reservoir to flex with a magnitude and direction related to the amplitude and polarity respectively of the potential. In an embodiment, flexing of the reservoir causes fluid to either inflate or deflate the fluid-filled lens module.

23 Claims, 3 Drawing Sheets

U.S. PATENT DOCUMENTS

| | | | |
|---|---|---|---|
| 5,440,357 A | 8/1995 | Quaglia | |
| 5,515,203 A | 5/1996 | Nye | |
| 5,563,528 A | 10/1996 | Diba et al. | |
| 5,574,598 A | 11/1996 | Koumura et al. | |
| 5,636,368 A | 6/1997 | Harrison et al. | |
| 5,668,620 A | 9/1997 | Kurtin et al. | |
| 5,684,637 A | 11/1997 | Floyd | |
| 5,719,397 A | 2/1998 | Hallett et al. | |
| 5,731,909 A | 3/1998 | Schachar | |
| 5,739,959 A | 4/1998 | Quaglia | |
| 5,774,273 A | 6/1998 | Bornhorst | |
| 5,790,882 A | 8/1998 | Silver et al. | |
| 5,900,921 A | 5/1999 | Min | |
| 5,952,846 A | 9/1999 | Silver | |
| 5,956,183 A | 9/1999 | Epstein et al. | |
| 5,963,048 A | 10/1999 | Harrison et al. | |
| 5,973,852 A | 10/1999 | Task | |
| 5,999,328 A | 12/1999 | Kurtin et al. | |
| 6,040,947 A | 3/2000 | Kurtin et al. | |
| 6,053,610 A | 4/2000 | Kurtin et al. | |
| 6,069,742 A | 5/2000 | Silver | |
| 6,081,388 A | 6/2000 | Widl | |
| 6,091,892 A | 7/2000 | Xue et al. | |
| 6,188,525 B1 | 2/2001 | Silver | |
| 6,246,528 B1 | 6/2001 | Schachar | |
| 6,493,151 B2 | 12/2002 | Schachar | |
| 6,552,860 B1 | 4/2003 | Alden | |
| 6,618,208 B1 | 9/2003 | Silver | |
| 6,626,532 B1 | 9/2003 | Nishioka et al. | |
| 6,715,876 B2 | 4/2004 | Floyd | |
| 6,836,374 B2 | 12/2004 | Esch et al. | |
| 6,924,944 B2 | 8/2005 | Sekiyama | |
| 6,930,838 B2 | 8/2005 | Schachar | |
| 6,992,843 B2 | 1/2006 | Juhala | |
| 7,068,439 B2 | 6/2006 | Esch et al. | |
| 7,085,065 B2 | 8/2006 | Silver | |
| 7,142,369 B2 | 11/2006 | Wu et al. | |
| 7,198,603 B2 | 4/2007 | Penner et al. | |
| 7,256,943 B1 | 8/2007 | Kobrin et al. | |
| 7,261,736 B1 | 8/2007 | Azar | |
| 7,324,287 B1 | 1/2008 | Gollier | |
| 7,325,922 B2 | 2/2008 | Spivey | |
| 7,338,159 B2 | 3/2008 | Spivey | |
| 7,342,733 B2 | 3/2008 | Takei | |
| 7,369,321 B1 | 5/2008 | Ren et al | |
| 7,382,544 B2 | 6/2008 | Cernasov | |
| 7,405,884 B2 | 7/2008 | Nishioka et al. | |
| 7,423,811 B2 | 9/2008 | Silver | |
| 7,440,193 B2 | 10/2008 | Gunasekaran et al. | |
| 7,453,646 B2 | 11/2008 | Lo | |
| 7,475,985 B2 | 1/2009 | Blum et al. | |
| 7,580,195 B2 | 8/2009 | Choi et al. | |
| 7,580,197 B2 | 8/2009 | Omura et al. | |
| 7,594,726 B2 | 9/2009 | Silver | |
| 7,604,349 B2 | 10/2009 | Blum et al. | |
| 2003/0144581 A1 * | 7/2003 | Conn et al. | 600/309 |
| 2004/0240076 A1 | 12/2004 | Silver | |
| 2005/0140922 A1 | 6/2005 | Bekerman et al. | |
| 2006/0066808 A1 | 3/2006 | Blum et al. | |
| 2006/0077562 A1 | 4/2006 | Silver | |
| 2006/0164731 A1 | 7/2006 | Wu et al. | |
| 2006/0245071 A1 | 11/2006 | George et al. | |
| 2006/0250699 A1 | 11/2006 | Silver | |
| 2007/0030573 A1 | 2/2007 | Batchko et al. | |
| 2007/0211207 A1 * | 9/2007 | Lo et al. | 351/41 |
| 2008/0002150 A1 | 1/2008 | Blum et al. | |
| 2008/0007689 A1 | 1/2008 | Silver | |
| 2008/0008600 A1 | 1/2008 | Silver | |
| 2008/0019015 A1 | 1/2008 | Fernandez et al. | |
| 2008/0084532 A1 | 4/2008 | Kurtin | |
| 2008/0112059 A1 | 5/2008 | Choi et al. | |
| 2008/0218873 A1 | 9/2008 | Batchko et al. | |
| 2008/0231963 A1 | 9/2008 | Batchko et al. | |
| 2008/0266635 A1 * | 10/2008 | Nishioka et al. | 359/223 |
| 2008/0285143 A1 | 11/2008 | Batchko et al. | |
| 2008/0316587 A1 | 12/2008 | Tijburg et al. | |
| 2009/0021843 A1 | 1/2009 | Obrebski et al. | |
| 2009/0052409 A1 | 2/2009 | Chen et al. | |
| 2009/0086331 A1 | 4/2009 | Gunasekaran et al. | |
| 2009/0116118 A1 | 5/2009 | Frazier et al. | |
| 2009/0128922 A1 | 5/2009 | Justis et al. | |
| 2009/0195882 A1 | 8/2009 | Bolle et al. | |
| 2009/0213471 A1 | 8/2009 | Silver et al. | |
| 2009/0251792 A1 | 10/2009 | Suzuki et al. | |
| 2010/0045930 A1 | 2/2010 | Silver et al. | |
| 2010/0053543 A1 | 3/2010 | Silver et al. | |
| 2010/0208194 A1 | 8/2010 | Gupta et al. | |
| 2010/0208195 A1 | 8/2010 | Gupta et al. | |

OTHER PUBLICATIONS

Jalie, M., *The Principles of Ophthalmic Lenses*, 4th Edition, Chapter 18 (pp. 413-468), The Association of Dispensing Opticians, Hazell Watson & Viney Limited, London, 58 pages (1984).

Markoff, J., "Scientists At Work: Stephen Kurtin—Making Eyeglasses That Let Wearers Change Focus on the Fly," *The New York Times*, 3 pages (Aug. 4, 2009).

Tang, S.K.Y. et al., "Dynamically Reconfigurable Liquid-Core Liquid-Cladding Lens in a Microfluidic Channel," *Lab on a Chip*, vol. 8, No. 3, p. 395-401, 8 pages (Mar. 2008).

Gupta, A. et al., U.S. Appl. No. 12/855,465, filed Aug. 12, 2010, entitled "Fluid-Filled Lenses and their Opthalmic Applications."

Egan, W. et al., U.S. Appl. No. 13/270,797, filed Oct. 11, 2011, entitled "Fluid Filled Adjustable Contact Lenses."

International Search Report and Written Opinion, dated Feb. 6, 2012, for PCT Appl. No. PCT/US2011/055768, 7 pages.

Nibauer, L. et al., U.S. Appl. No. 13/270,905, filed Oct. 11, 2011, entitled "Non Powered Concepts for a Wire Frame of Fluid Filled Lenses."

* cited by examiner

PERIMETER PIEZO RESERVOIR IN A LENS

CROSS REFERENCE TO RELATED APPLICATIONS

This application claims priority to U.S. Provisional Patent Application No. 61/391,827 filed Oct. 11, 2010, which is incorporated herein by reference in its entirety.

BACKGROUND

1. Field

Embodiments of the present invention relate to fluid-filled lenses and in particular to variable fluid-filled lenses.

2. Background

Basic fluid lenses have been known since about 1958, as described in U.S. Pat. No. 2,836,101, incorporated herein by reference in its entirety. More recent examples may be found in "Dynamically Reconfigurable Fluid Core Fluid Cladding Lens in a Microfluidic Channel" by Tang et al., Lab Chip, 2008, vol. 8, p. 395, and in WIPO publication WO2008/063442, each of which is incorporated herein by reference in its entirety. These applications of fluid lenses are directed towards photonics, digital phone and camera technology and microelectronics.

Fluid lenses have also been proposed for ophthalmic applications (see, e.g., U.S. Pat. No. 7,085,065, which is incorporated herein by reference in its entirety). In all cases, the advantages of fluid lenses, such as a wide dynamic range, ability to provide adaptive correction, robustness, and low cost have to be balanced against limitations in aperture size, possibility of leakage, and consistency in performance. The '065 patent, for example, has disclosed several improvements and embodiments directed towards effective containment of the fluid in the fluid lens to be used in ophthalmic applications. Power adjustment in fluid lenses has been effected by injecting additional fluid into a lens cavity, by electrowetting, application of ultrasonic impulse, and by utilizing swelling forces in a cross-linked polymer upon introduction of a swelling agent such as water.

BRIEF SUMMARY

In an embodiment, a system for a sealed fluid filled lens includes a lens module having an outer lens and an inner lens. A housing is located around the perimeter of the lens module. A tubular reservoir is disposed within the housing, wherein the reservoir is in fluid communication with the lens module. The system also includes a power source which provides an actuation signal to the reservoir. The reservoir is a piezoelectric material having woven electrodes disposed around the outside surface to receive the actuation signal.

A method of actuating a sealed fluid filled lens system that has a lens module, a housing located around the perimeter of the lens module, a reservoir disposed within the housing wherein the reservoir is in fluid communication with the lens module, and a power source. The method includes generating an actuation signal from the power source coupled to the reservoir disposed within the housing located around the perimeter of the lens module and transmitting the actuation signal from the power source to the electrodes disposed around the outside of the reservoir. The method further includes flexing the reservoir upon receiving the actuation signal, wherein the flexing causes fluid to move between the reservoir and the lens module.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

Figure 1:
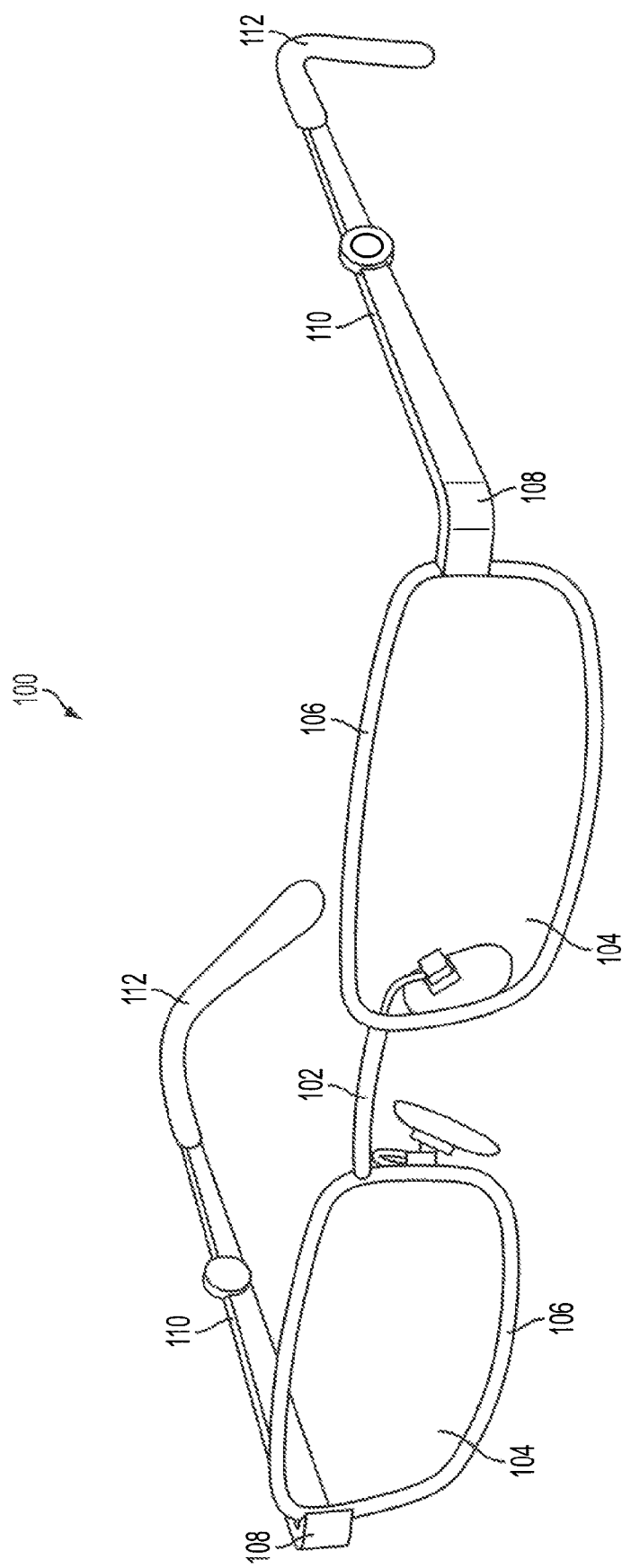
FIG. 1 illustrates a perspective view of an embodiment of a fluid filled lens system.

Embodiments of the present invention will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

Fluid lenses have important advantages over conventional means of vision correction, such as rigid lenses and contact lenses. First, fluid lenses are easily adjustable. Thus, a presbyope who requires an additional positive power correction to view near objects can be fitted with a fluid lens of base power matching the distance prescription. The user can then adjust the fluid lens to obtain additional positive power correction as needed to view objects at intermediate and other distances.

Second, fluid lenses can be adjusted continuously over a desired power range by the wearer. As a result, the wearer can adjust the power to precisely match the refractive error for a particular object distance in a particular light environment. Thus, fluid lenses allow adjustment of power to compensate for alteration of the natural depth of focus of the eye that depends on the wearer's pupil size, which is in turn dependent on the ambient light level.

Third, although 20/20 vision, which corresponds to an image resolution of 1 minute of arc (1/60 degree) is generally acknowledged to represent an acceptable quality of vision, the human retina is capable of finer image resolution. It is known that a healthy human retina is capable of resolving 20 seconds of arc (1/300 degree). Corrective eyeglasses designed to enable a patient to achieve this superior level of vision have a resolution of about 0.10 D or better. This resolution can be achieved with continuously adjustable fluid lens elements.

In an embodiment of a fluid lens assembly, one or more fluid lenses may be provided with its own actuation system, so that a lens for each eye can be adjusted independently. This feature allows wearers, such as anisometropic patients, to correct any refractive error in each eye separately, so as to achieve appropriate correction in both eyes, which can result in better binocular vision and binocular summation.

FIG. 1 illustrates a perspective view of a fluid filled lens system 100 according to an embodiment of the present invention. Fluid filled lens system 100 includes a bridge 102, left and right lens module 104, left and right hinge 108, left and right temple piece 110, and left and right distal end 112 of temple pieces 110. It should be appreciated that all descriptions of each component listed apply to both the left and right versions of each component in the system. Hinge 108 connects lens module 104 to temple piece 110. Distal end 112 of temple piece 110 is shaped to fit over the wearer's ear.

In an embodiment, lens module 104 further comprises a housing 106 which is located along the perimeter of lens module 104. Lens module 104 may further include a flexible back surface provided by, for example, a flexible membrane (not shown) stretched flat over the edge of a rigid optical lens. In an embodiment housing 106 contains a tubular reservoir (not shown). To change the optical power of lens module 104, the membrane may be inflated through the addition of fluid from the reservoir. The reservoir may be attached to lens module 104 via a connecting tube (not shown). The connecting tube is designed to be impermeable to the fluid contained therein. In an embodiment, the overall assembly including lens module 104, the connecting tube, and the reservoir is designed to maintain a seal excluding fluids and air for an overall use period of two years or more. In an embodiment, the connecting tube is thin in order to be accommodated within the housing 106. In an embodiment, the connecting tube is less than 2.0 mm in outer diameter and less than 0.50 mm in wall thickness, in order to maintain an adequate flow of fluid.

A design of lens module 104 and a method of actuating the reservoir disposed within housing 106 to change the optical power of lens module 104 is described herein.

Figure 2:
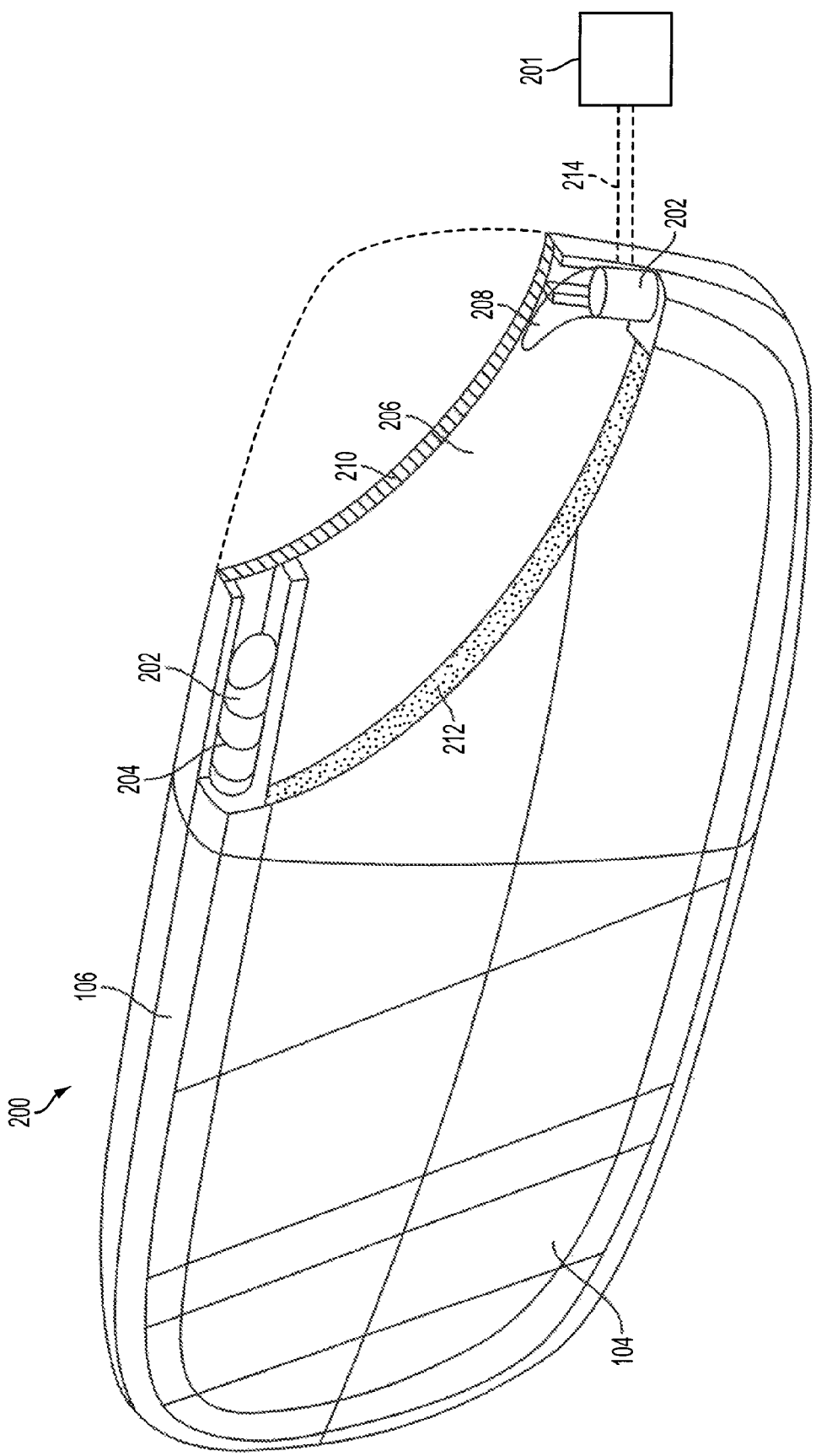
FIG. 2 illustrates a perspective cut-away view of an exemplary perimeter reservoir actuator in a lens module

FIG. 2 illustrates a cut-away perspective view of an exemplary perimeter reservoir actuator 200. Perimeter reservoir actuator 200 includes a lens module 104 having an outer lens 212, an inner lens 210, and a fluid cavity 206. A housing 106 wraps around the perimeter of lens module 104 and a reservoir 202 having electrodes 204 is disposed within housing 106. A connecting tube 208 is placed between reservoir 202 and fluid cavity 206. Coupling 214 exists between electrodes 204 and a power source 201. In an embodiment, reservoir 202 is a piezoelectric material having woven electrodes 204. In an embodiment, outer lens 212 is a rigid optical lens. In an embodiment, inner lens 210 is a flexible membrane.

Piezoelectric materials accumulate charge in response to an applied stress. The process is reversible, such that applying an electric field induces a mechanical strain upon the material. The crystal orientation of the piezoelectric material determines the optimal strain direction under the influence of an electric field. Crystals, ceramics and polymers may exhibit piezoelectricity. Examples of crystals that exhibit piezoelectricity include quartz, and topaz while examples of ceramics include PZT and sodium potassium niobate. The most common polymer piezoelectric material is polyvinylidene fluoride (PVDF). The piezoelectric coefficient of PVDF has been observed to be nearly 10 times larger than any other polymer.

In an embodiment, reservoir 202 is made from PVDF. The polymer chains of the PVDF can be mechanically oriented and placed under a strong electric field (>30 MV/m) in order to instill piezoelectric properties. PVDF films may be molded or injected. For example, a PVDF film may be molded in a tubular shape. Although examples described herein may refer to an embodiment where electrodes are woven into the reservoir material, one of ordinary skill in the art will recognize that the electrodes may also be disposed on a surface of the reservoir material.

In an embodiment, an electric potential is applied by power source 201 to electrodes 204 woven within the thickness of reservoir 202. The applied potential causes a linearly proportional electric field to form between electrodes 204. The generated electric field causes reservoir 202 to either constrict or inflate depending on the polarity of the applied field. The strength of the applied electric potential may be controlled by the wearer via a control circuit. In an embodiment, the control circuit includes a potentiostat to allow the wearer to control the strength of the applied potential. Another example of the control circuit may include switches. In a farther embodiment, the polarity of the generated electric field may also be controlled by the wearer via a switch within the control circuit. The design of the aforementioned control circuits to alter the electric potential would be apparent to a person having ordinary skill in the art.

In an embodiment, power source 201 is a zinc-air cell. Zinc-air cells are used most commonly as hearing aid batteries. Zinc-air cells typically have a nominal discharge voltage of 1.2 volts. Other examples of power sources include lithium, alkaline or silver oxide coin cell batteries, with typical nominal discharge voltages of 3 volts for lithium batteries and 1.5 volts for alkaline and silver oxide batteries. Another exemplary power source 201 is a capacitor. Charge may be stored on the capacitor from a secondary source such as an energy harvesting device. In an embodiment, power source 201 is located within temple piece 110.

In an embodiment, coupling 214 between electrodes 204 and power source 201 are physical leads. Another example of coupling 214 is wireless signals which are sent, for example, by an RF transmitter.

Figure 3B:
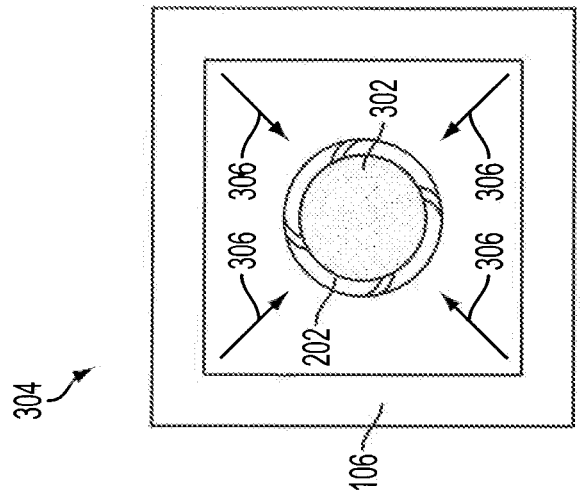
FIG. 3b illustrates a cross-section view of the perimeter reservoir actuator of FIG. 2 in a constricted state, according to an embodiment.
Figure 3A:
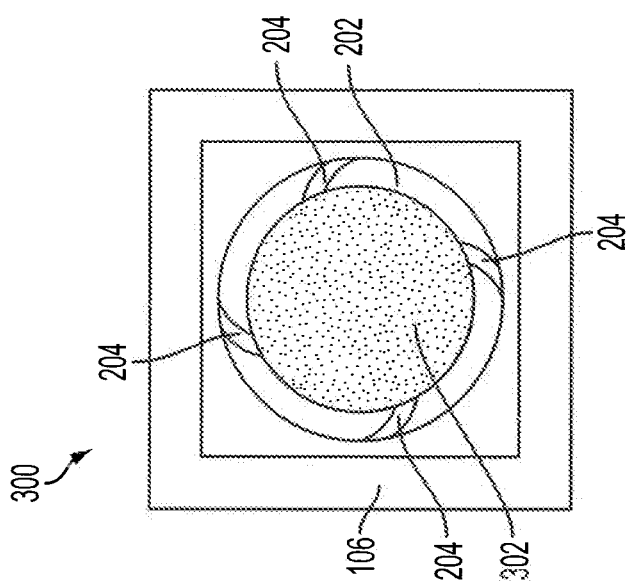
FIG. 3a illustrates a cross-section view of the perimeter reservoir actuator of FIG. 2 in an inflated state, according to an embodiment.

FIG. 3a illustrates an exemplary cross-section of reservoir 202 in its inflated state 300 within housing 106. Also shown are electrodes 204 woven through the thickness of reservoir 202, and a fluid 302 filling the volume within reservoir 202. Upon generation of an electric field to electrodes 204 with a first polarity, reservoir 202 enters a constricted state 304 as exemplified by FIG. 3b. A compressive force 306 on all sides of reservoir 202 causes reservoir 202 to constrict. Upon constricting, fluid 302 is forced from reservoir 202, through connecting tube 208, and into fluid cavity 206, thus increasing the curvature of lens module 104. It can be understood that the strength of compressive force 306 is proportional to the strength of the generated electric field. One of ordinary skill in the art will recognize that different electric potentials supplied to electrodes 204 will result in different constricted states 304, allowing for a customizable curvature change of lens module 104 using a variable applied potential. In an embodiment, generation of an electric field to electrodes 204 with a second polarity opposite that of the first polarity will cause reservoir 202 to flex to an inflated state 300. In an embodiment, changing from constricted state 304 to inflated state 300, creates a negative pressure within reservoir 202 and pulls fluid 302 from fluid cavity 206, through connecting tube 208, and into reservoir 202, thus decreasing the curvature of lens module 104.

The pieces of the various system components described, for example, but not limited to, the temple piece, housing, bridge, hinge etc., may be manufactured through any suitable process, such as metal injection molding (MIM), cast, machining, plastic injection molding, and the like. The choice of materials may be further informed by the requirements of mechanical properties, temperature sensitivity, optical properties such as dispersion, moldability properties, or any other factor apparent to a person having ordinary skill in the art.

The fluid used in the fluid lens may be a colorless fluid, however, other embodiments include fluid that is tinted, depending on the application, such as if the intended application is for sunglasses. One example of fluid that may be used is manufactured by Dow Corning of Midland, Mich., under the name "diffusion pump oil," which is also generally referred to as "silicone oil."

The fluid lens may include a rigid optical lens made of glass, plastic, or any other suitable material. Other suitable materials include, for example and without limitation, Diethylglycol bisallyl carbonate (DEG-BAC), poly(methyl methacrylate) (PMMA), and a proprietary polyurea complex, trade name TRIVEX (PPG).

The fluid lens may include a membrane made of a flexible, transparent, water impermeable material, such as, for example and without limitation, one or more of clear and elastic polyolefins, polycycloaliphatics, polyethers, polyesters, polyimides and polyurethanes, for example, polyvinylidene chloride films, including commercially available films, such as those manufactured as MYLAR or SARAN. Other polymers suitable for use as membrane materials include, for example and without limitation, polysulfones, polyurethanes, polythiourethanes, polyethylene terephthalate, polymers of cycloolefms and aliphatic or alicyclic polyethers.

The connecting tube may be made of one or more materials such as TYGON (polyvinyl chloride), PVDF (Polyvinyledene fluoride), and natural rubber. For example, PVDF may be suitable based on its durability, permeability, and resistance to crimping.

The housing may be any suitable shape, and may be made of plastic, metal, or any other suitable material. In an embodiment, the housing is made of a lightweight material such as, for example and without limitation, high impact resistant plastics material, aluminum, titanium, or the like. In an embodiment, the housing may be made entirely or partly of a transparent material.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A sealed fluid filled lens system comprising:
    a lens module having an outer lens and an inner lens;
    a housing located around the perimeter of the lens module;
    a tubular reservoir disposed within the housing wherein the reservoir is in fluid communication with the lens module; and
    a power source which provides an actuation signal to the reservoir,
    wherein the reservoir is a piezoelectric material having electrodes woven within the thickness of the reservoir.

2. The system of claim 1, further comprising leads between the power source and the electrodes.

3. The system of claim 2, wherein the actuation signal provided by the power source is an electric potential.

4. The system of claim 3, wherein the amplitude and/or polarity of the electric potential can be affected via a control circuit.

5. The system of claim 4, wherein the control circuit includes a potentiostat.

6. The system of claim 4, wherein the control circuit includes a switch.

7. The system of claim 3, wherein an electric potential with a first polarity causes the reservoir to constrict.

8. The system of claim 3, wherein an electric potential with a second polarity opposite that of the first polarity causes the reservoir to inflate.

9. The system of claim 1, wherein the outer lens is a rigid optical lens.

10. The system of claim 1, wherein the inner lens is a flexible membrane.

11. The system of claim 1, further comprising a connecting tube between the lens module and the reservoir.

12. The system of claim 1, wherein the power source is a zinc-air cell.

13. The system of claim 1, wherein the power source is a lithium coin cell battery.

14. The system of claim 1, wherein the power source is a charged capacitor.

15. The system of claim 14, wherein the capacitor is charged by another source.

16. A method of actuating a sealed fluid filled lens that has a lens module, a housing located around the perimeter of the lens module, a reservoir disposed within the housing wherein the reservoir is in fluid connection with the lens module, and a power source, the method comprising:
    generating an actuation signal from a power source coupled to the reservoir disposed within the housing located around the perimeter of the lens module;
    transmitting the actuation signal from the power source to electrodes woven within the thickness of the reservoir; and
    flexing the reservoir upon receiving the actuation signal, wherein the flexing causes fluid to move between the reservoir and the lens module.

17. The method of claim 16, wherein the transmission is performed wirelessly.

18. The method of claim 16, wherein the transmission is performed over leads which connect the power source to the electrodes.

19. The method of claim 16, wherein the actuation signal provided by the power source is an electric potential.

20. The method of claim 16, further comprising affecting the amplitude and/or polarity of the electric potential via a control circuit.

21. The method of claim 20, wherein the flexing direction is based on the polarity of the electric potential.

22. The method of claim 21, wherein a positive electric potential causes the reservoir to constrict.

23. The method of claim 21, wherein a negative electric potential causes the reservoir to inflate.

* * * * *